United States Patent
Voss-Wolff et al.

(10) Patent No.: US 12,536,728 B2
(45) Date of Patent: Jan. 27, 2026

(54) SHADOW MAP BASED LATE STAGE REPROJECTION

(71) Applicant: Microsoft Technology Licensing, LLC, Redmond, WA (US)

(72) Inventors: Christian Voss-Wolff, Herzberg am Harz (DE); Norbert Clemens Kern, Kirchberg an der Murr (DE)

(73) Assignee: Microsoft Technology Licensing, LLC, Redmond, WA (US)

( * ) Notice: Subject to any disclaimer, the term of this patent is extended or adjusted under 35 U.S.C. 154(b) by 131 days.

(21) Appl. No.: 18/614,976

(22) Filed: Mar. 25, 2024

(65) Prior Publication Data

US 2025/0299412 A1    Sep. 25, 2025

(51) Int. Cl.
  *G06T 15/00*  (2011.01)
  *G06T 15/60*  (2006.01)
  *G06T 19/20*  (2011.01)

(52) U.S. Cl.
  CPC ........... *G06T 15/005* (2013.01); *G06T 15/60* (2013.01); *G06T 19/20* (2013.01); *G06T 2215/12* (2013.01); *G06T 2219/2012* (2013.01)

(58) Field of Classification Search
  None
  See application file for complete search history.

(56) References Cited

U.S. PATENT DOCUMENTS

| | | | |
|---|---|---|---|
| 5,870,097 A * | 2/1999 | Snyder | G06T 13/80 345/422 |
| 2016/0093098 A1* | 3/2016 | Andersson | G06T 15/60 345/426 |
| 2017/0374341 A1* | 12/2017 | Michail | G06T 19/00 |
| 2019/0037244 A1* | 1/2019 | Melkote Krishnaprasad | H04N 19/105 |
| 2020/0118341 A1* | 4/2020 | Ohashi | H04N 9/75 |
| 2021/0027520 A1* | 1/2021 | Story | G06T 15/405 |
| 2022/0148250 A1* | 5/2022 | Kocdemir | G06T 15/005 |

OTHER PUBLICATIONS

Daniel Scherzer, Stefan Jeschke, Michael Wimmer, "Pixel-Correct Shadow Maps with Temporal Reprojection and Shadow Test Confidence", Jun. 25, 2007, Eurographics, EGSR'07: Proceedings of the 18th Eurographics conference on Rendering Techniques, pp. 45-50.*

(Continued)

*Primary Examiner* — Robert Bader
(74) *Attorney, Agent, or Firm* — Workman Nydegger

(57) ABSTRACT

Techniques for improving how LSR is performed are disclosed. A service accesses a depth image, a pose correction matrix, and a color image. The service extracts a carrier geometry from the depth image. The service forward projects the LSR carrier geometry by multiplying each vertex of the LSR carrier geometry with the pose correction matrix. While the GPU is operating in a shadow map mode, the service causes the GPU to perform a rasterization process to produce a UV map and a Z buffer. The service discards the UV map, resulting in the per pixel UV corrections included in the UV map also being discarded. The service recovers the per pixel UV corrections using the Z buffer. The service uses the recovered per pixel UV corrections to resample the color image, resulting in generation of a corrected color image.

20 Claims, 6 Drawing Sheets

(56) References Cited

OTHER PUBLICATIONS

Cass Everitt, Ashu Rege, Cem Cebenoyan, "Hardware Shadow Mapping", 2000, Nvidia, Technical Report.*

Paul Rosen, "Rectilinear Texture Warping for Fast Adaptive Shadow Mapping", Mar. 9, 2012, ACM, I3D '12: Proceedings of the ACM SIGGRAPH Symposium on Interactive 3D Graphics and Games, pp. 151-158.*

* cited by examiner

SHADOW MAP BASED LATE STAGE REPROJECTION

BACKGROUND

Head mounted devices (HMD), or other wearable devices, are becoming highly popular. These types of devices are able to provide a so-called "extended reality" experience.

The phrase "extended reality" (ER) is an umbrella term that collectively describes various different types of immersive platforms. Such immersive platforms include virtual reality (VR) platforms, mixed reality (MR) platforms, and augmented reality (AR) platforms. The ER system provides a "scene" to a user. As used herein, the term "scene" generally refers to any simulated environment (e.g., three-dimensional (3D) or two-dimensional (2D)) that is displayed by an ER system.

For reference, conventional VR systems create completely immersive experiences by restricting their users' views to only virtual environments. This is often achieved through the use of an HMD that completely blocks any view of the real world. Conventional AR systems create an augmented-reality experience by visually presenting virtual objects that are placed in the real world. Conventional MR systems also create an augmented-reality experience by visually presenting virtual objects that are placed in the real world, and those virtual objects are typically able to be interacted with by the user. Furthermore, virtual objects in the context of MR systems can also interact with real world objects. AR and MR platforms can also be implemented using an HMD. ER systems can also be implemented using laptops, handheld devices, HMDs, and other computing systems.

Unless stated otherwise, the descriptions herein apply equally to all types of ER systems, which include MR systems, VR systems, AR systems, and/or any other similar system capable of displaying virtual content. An ER system can be used to display various different types of information to a user. Some of that information is displayed in the form of a "hologram." As used herein, the term "hologram" generally refers to image content that is displayed by an ER system. In some instances, the hologram can have the appearance of being a 3D object while in other instances the hologram can have the appearance of being a 2D object. In some instances, a hologram can also be implemented in the form of an image displayed to a user.

Continued advances in hardware capabilities and rendering technologies have greatly increased the realism of holograms and scenes displayed to a user within an ER environment. For example, in ER environments, a hologram can be placed within the real world in such a way as to give the impression that the hologram is part of the real world. As a user moves around within the real world, the ER environment automatically updates so that the user is provided with the proper perspective and view of the hologram. This ER environment is often referred to as a computer-generated scene, or simply a "scene."

In such systems, the user's body (specifically the head) can move in real time in relation to the virtual environment. For example, in an ER application, if the user tilts her head in one direction, she will not expect the image or hologram to tilt with them. Ideally, the system will measure the position of the user's head and render images at a fast enough rate to eliminate any jitter or drift in the image position as perceived by the user. However, typical graphics processing units ("GPUs") currently render frames between only 30 to 60 frames per second, depending on the quality and performance of the GPU. This results in a potential delay of 16 to 33 milliseconds between the point in time of when the head position is detected and when the image is actually displayed on the HMD. Additional latency can also be associated with the time that is required to determine the head position and/or delays between the GPU's frame buffer and the final display. The result is a potentially large error between where the user would expect an image and where the image is displayed, leading to user discomfort.

To reduce or eliminate such errors, existing systems apply late stage corrections to adjust the image after it is rendered by the GPU. This process is performed before the pixels are displayed so as to compensate for rotation, translation, and/or magnification due to head movement. This adjustment process is often referred to as "Late State Adjustment," "Late Stage Reprojection," "LSR" or "LSR Adjustments." Hereinafter, this disclosure will use the abbreviation "LSR." Accordingly, there exists a strong need in the field to efficiently improve the LSR operations of systems.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

In some aspects, the techniques described herein relate to a method for causing a graphics processing unit (GPU) to operate in a shadow map mode to facilitate performance of a shadow map based late stage reprojection (LSR) process to generate a corrected image, wherein the GPU operating in the shadow map mode enables the GPU to operate faster than when the GPU is not in the shadow map mode, said method including: accessing LSR input including a depth image, a pose correction matrix, and a color image; extracting a carrier geometry from the depth image; forward projecting the LSR carrier geometry by multiplying each vertex of the LSR carrier geometry with the pose correction matrix; while the GPU is operating in a shadow map mode, causing the GPU to perform a rasterization process to produce a set of per pixel UV corrections, which are included in a UV map, wherein the GPU additionally generates a Z buffer including depth values; discarding the UV map, resulting in the set of per pixel UV corrections also being discarded; recovering the set of per pixel UV corrections using the Z buffer, wherein said recovering includes backward projecting the depth values included in the Z buffer using the pose correction matrix; and using the recovered set of per pixel UV corrections to resample the color image, resulting in generation of a corrected color image.

In some aspects, the techniques described herein relate to a computer system that causes a graphics processing unit (GPU) to operate in a shadow map mode to facilitate performance of a shadow map based late stage reprojection (LSR) process to generate a corrected image, wherein the GPU operating in the shadow map mode enables the GPU to operate faster than when the GPU is not in the shadow map mode, said computer system including: a processor system; and a storage system that stores instructions that are executable by the processor system to cause the computer system to: access LSR input including a depth image, a pose correction matrix, and a color image; extract a carrier geometry from the depth image; forward project the LSR carrier geometry by multiplying each vertex of the LSR carrier geometry with the pose correction matrix; while the GPU is operating in the shadow map mode, cause the GPU to perform a rasterization process to produce a set of per pixel UV corrections, which are included in a UV map, wherein the GPU additionally generates a Z buffer including depth values; discard the UV map, resulting in the set of per pixel UV corrections also being discarded; recover the set of per pixel UV corrections using the Z buffer, wherein said recovering includes backward projecting the depth values included in the Z buffer using the pose correction matrix; and use the recovered set of per pixel UV corrections to resample the color image, resulting in generation of a corrected color image.

In some aspects, the techniques described herein relate to a head mounted device (HMD) that causes a graphics processing unit (GPU) to operate in a shadow map mode to facilitate performance of a shadow map based late stage reprojection (LSR) process to generate a corrected image, wherein the GPU operating in the shadow map mode enables the GPU to operate faster than when the GPU is not in the shadow map mode, said HMD including: a processor system; and a storage system that stores instructions that are executable by the processor system to cause the HMD to: access LSR input including a depth image, a pose correction matrix, and a color image; extract a carrier geometry from the depth image; forward project the LSR carrier geometry by multiplying each vertex of the LSR carrier geometry with the pose correction matrix; cause the GPU to operate in the shadow map mode; while the GPU is operating in the shadow map mode, cause the GPU to perform a rasterization process to produce a set of per pixel UV corrections, which are included in a UV map, wherein the GPU additionally generates a Z buffer; discard the UV map, resulting in the set of per pixel UV corrections also being discarded; recover the set of per pixel UV corrections using the Z buffer, wherein said recovering includes backward projecting depth values included in the Z buffer using the pose correction matrix; and use the recovered set of per pixel UV corrections to resample the color image, resulting in generation of a corrected color image.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

For many ER systems, one goal is to render a 3D image for a virtual camera position so that the virtual camera matches the measured real position of the user's head as closely as possible. Any error between the virtual and real positions at the time the 3D image is shown on an HMD will often cause vestibular discomfort to the user. Because producing a 3D image takes time, during which the user's head will move away from its last measured position, ER systems generally include a last-millisecond correction process to "reproject" the 3D image into an updated virtual camera pose. That process, as described earlier, is referred to as LSR.

The disclosed embodiments relate to beneficial techniques that utilize what is referred to herein as a "shadow map fast path" mode of the GPU to produce a significant speedup to certain types of LSR. One type of LSR is referred to as "direct" LSR. Generally, direct LSR involves an LSR process that is implemented to directly produce the corrected color values. For instance, FIG. 1 illustrates an example of a direct LSR process.

Figure 1:
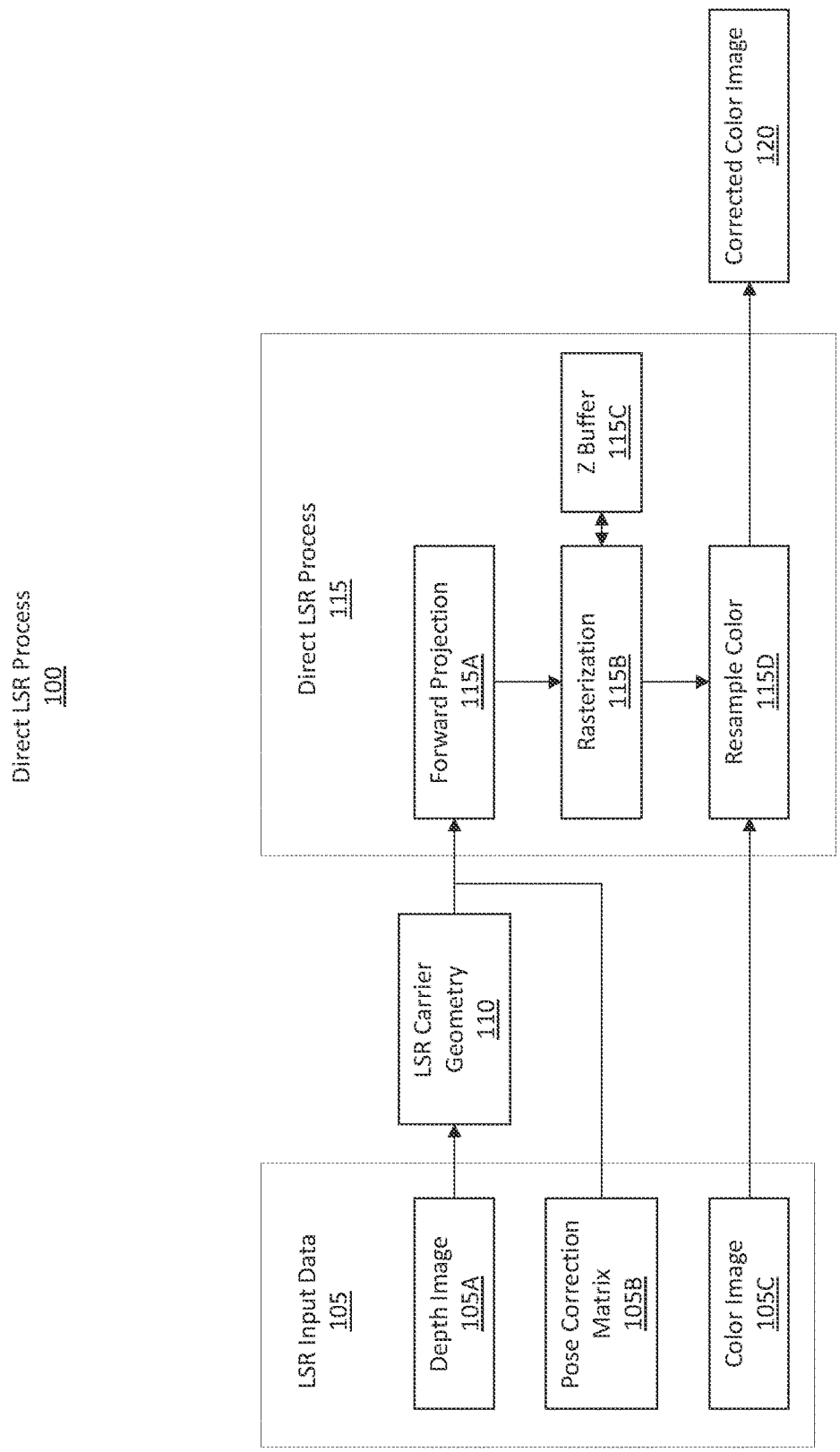
FIG. 1 illustrates an example of a direct LSR process.

FIG. 1 shows an example of a direct LSR process 100. In particular, the LSR input data 105 includes a depth image 105A, a pose correction matrix 105B, and a color image 105C. The depth image 105A and the color image 105C are rendered by an application. The pose correction matrix 105B is applied during the LSR process to produce a corrected color image suitable for presentation on the HMD display.

While each LSR type is implemented differently, for purposes of this description, it is reasonable to assume that each LSR type first extracts a carrier geometry (e.g., as shown by LSR carrier geometry 110) from the application's depth image 105A. In "planar" LSR, this LSR carrier geometry 110 is a simple plane. In depth LSR, however, this LSR carrier geometry 110 is a grid mesh that is sampled from the depth image 105A at regular points. In "adaptive depth" LSR, the carrier geometry is a grid mesh adaptively subdivided to match the application's depth image.

LSR carrier geometry 110 is then used during the direct LSR process 115. In particular, the LSR carrier geometry 110 is forward projected (e.g., as shown by forward projection 115A) by multiplying each vertex of the LSR carrier geometry 110 with the pose correction matrix 105B. That forward projection 115A operation is followed by rasterization 115B operation to produce a set of per pixel UV corrections (the letters "U" and "V" refer to the axes of the 2D image texture). The set of per pixel UV corrections is used to resample the color image 105C, as shown by resample color 115D. The rasterization 115B process makes use of a Z buffer 115C, which stores the camera distance for each pixel for the projected carrier geometry. The Z buffer 115C is used to resolve Z-ordering in case of occlusions that occur while projecting the LSR carrier geometry 110. The final output is a corrected color image 120.

Figure 2:
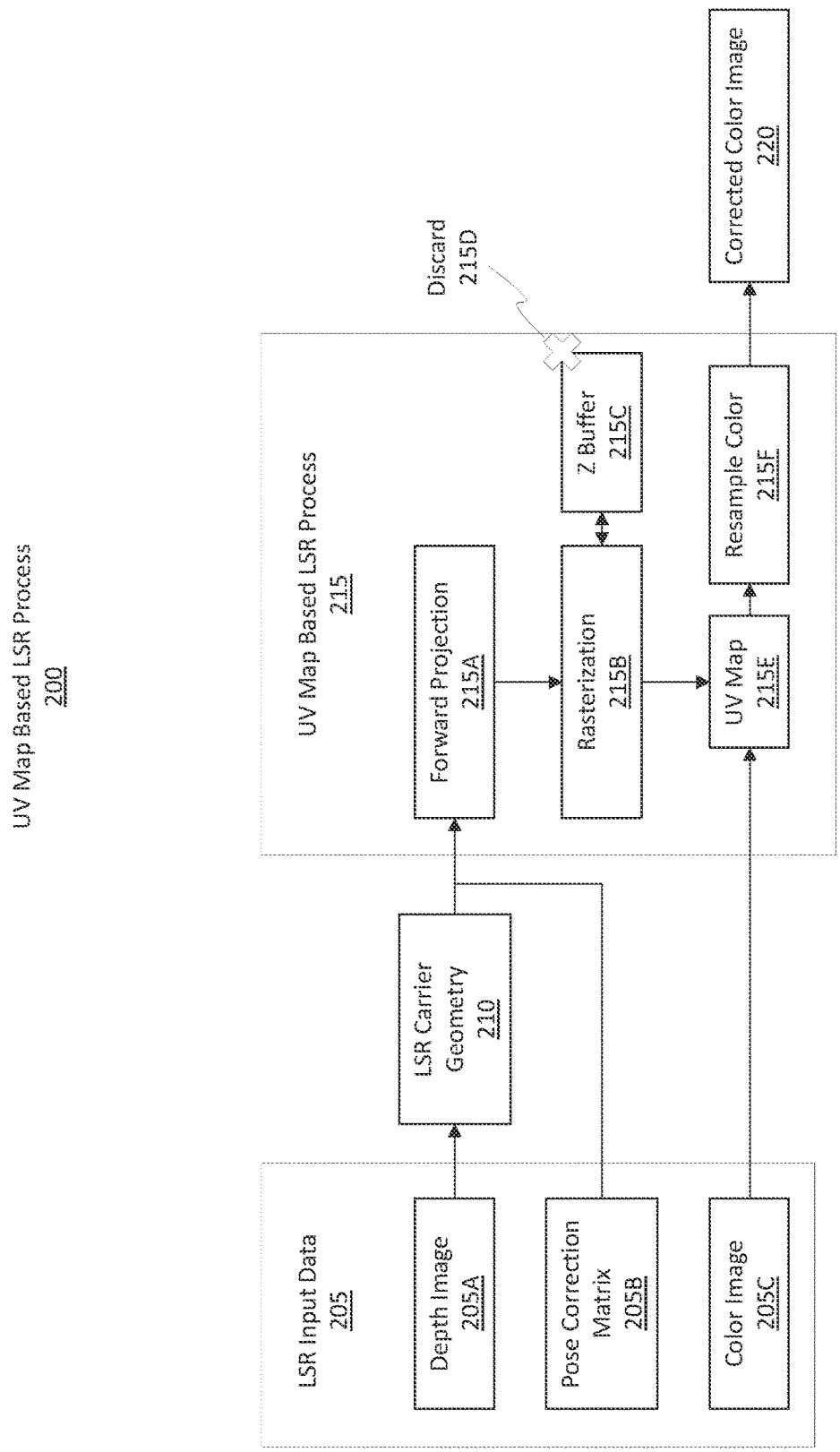
FIG. 2 illustrates an example of a UV map based LSR process.

Another type of LSR is referred to as "UV Map Based" LSR. FIG. 2 illustrates an example of the UV map based LSR process 200.

Similar to the direct LSR process 100 of FIG. 1, the LSR input data 205 includes a depth image 205A, a pose correction matrix 205B, and a color image 205C. The depth image 205A and the color image 205C are rendered by an application. The pose correction matrix 205B is applied during the LSR process to produce a corrected color image suitable for presentation on the HMD display.

The LSR process extracts a carrier geometry (e.g., as shown by LSR carrier geometry 210) from the application's depth image 205A. LSR carrier geometry 210 is then used during the UV map based LSR process 215. In particular, the LSR carrier geometry 210 is forward projected (e.g., as shown by forward projection 215A) by multiplying each of its vertices with the pose correction matrix 205B. That forward projection 215A operation is followed by rasterization 215B to produce a set of per pixel UV corrections that is included in a UV map 215E. Also produced by the rasterization 215B is a Z buffer 215C. Notably, however, in the UV map based LSR process 200, the Z buffer 215C is discarded 215D.

The set of per pixel UV corrections embodied within the UV map 215E is used to resample the color image 205C, as shown by resample color 215F. The final output is a corrected color image 220.

Notably, one optimization that can be used in the context of UV map based LSR is to split the LSR process into two parts. The first part produces the UV map 215E, which stores the computed amount of correction. The second part samples this UV map 215E to correct the color image 205C. While the Z buffer 215C is used to resolve Z ordering, the Z buffer 215C is discarded 215D after the generation process, as mentioned above.

Multiple advantages can be achieved from using the UV map based LSR process 200. For example, one advantage relates to the option of decoupling the LSR resolution from the display's resolution. In direct LSR processes, a correction is computed for every output pixel of the display hardware. This results in significant cost increases as the display resolution is increased. An intermediate UV map (e.g., UV map 215E), however, can be produced at a lower resolution (such as ½× or ¼× of the display resolution, or even lower), such that correction offsets are used for only a subset of pixels, with the correction for pixels in between samples being interpolated.

Another advantage relates to the option to decouple the LSR correction hardware from the display and color resampling hardware. Modern system-on-chip (SoCs) include highly efficient digital signal processing (DSP) that allows distorting a color image (e.g., color image 205C) given a distortion map in the form of a UV map (e.g., UV map 215E) at low cost and with high quality filtering. Ostensibly designed for the rectification of camera images, the same hardware units can also be used to perform the LSR correction. Doing so allows the option to split the LSR process across a more general unit for producing the UV map and to leave the actual application of the correction to the highly efficient re-sampler.

Having just described some of the various different types of LSR operations, this disclosure will now present a new type of LSR process referred to herein as "Shadow Map Based" LSR. This new type of LSR brings about numerous benefits, advantages, and practical applications in the technical field of image generation and correction. In particular, the disclosed embodiments are directed to significant improvements of UV map based LSR. As one example of an advantage, instead of using a UV map comprising correction offsets in the x and y dimensions, the disclosed embodiments are able to solely rely on the Z buffer shadow map that was used to resolve Z ordering. Beneficially, the Z buffer is often half the size of the UV map, so much less memory bandwidth is consumed as a result of using the Z buffer.

In performing the disclosed operations, the embodiments are also able to significantly speed up the overall LSR process even though additional operations are performed. This speed improvement is achieved by causing the GPU to operate in the shadow map mode. While in the shadow map mode, the GPU is often able to perform at least two times faster than when the GPU is not in the shadow map mode. As a result, the overall LSR process can be performed faster.

By reducing the amount of time needed to perform LSR, the embodiments are able to minimize or reduce the amount of latency that is involved with generating and displaying images to a user. As a result, the user's interaction with the computer system is improved. Accordingly, these and numerous other benefits will now be described in more detail throughout the remaining sections of this disclosure.

Example Architectures

Figure 3:
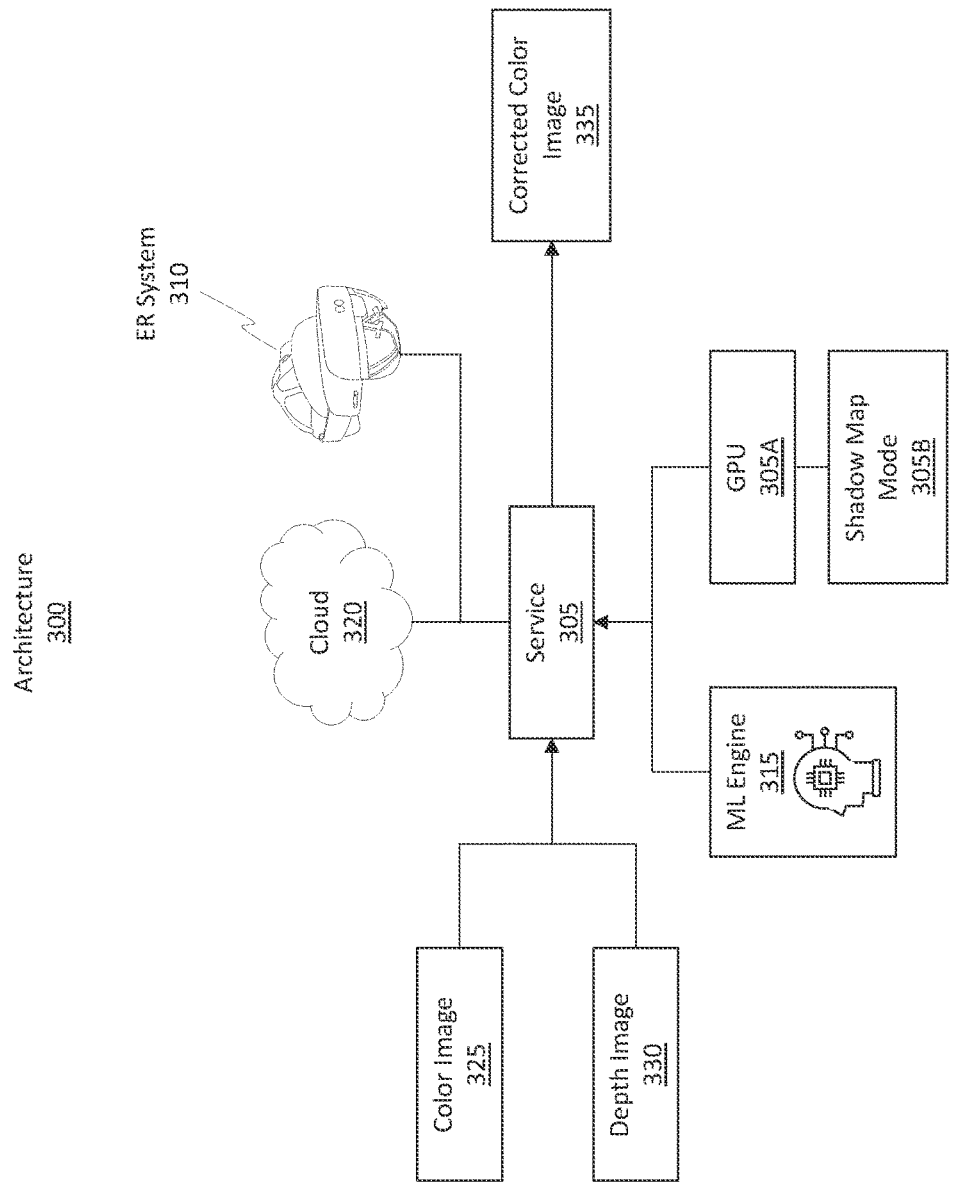
FIG. 3 illustrates an example computing architecture that can perform shadow map based LSR.

Having just described some of the high level benefits, advantages, and practical applications achieved by the disclosed embodiments, attention will now be directed to FIG. 3, which illustrates an example computing architecture 300 that can be used to achieve those benefits.

Architecture 300 includes a service 305, which can be implemented by an ER system 310 comprising an HMD. As used herein, the phrases ER system, HMD, platform, or wearable device can all be used interchangeably and generally refer to a type of system that displays holographic content (i.e. holograms). In some cases, ER system 310 is of a type that allows a user to see various portions of the real world and that also displays virtualized content in the form of holograms. That ability means ER system 310 is able to provide so-called "passthrough images" to the user. It is typically the case that architecture 300 is implemented on an MR or AR system, though it can also be implemented in a VR system.

As used herein, the term "service" refers to an automated program that is tasked with performing different actions based on input. In some cases, service 305 can be a deterministic service that operates fully given a set of inputs and without a randomization factor. In other cases, service 305 can be or can include a machine learning (ML) or artificial intelligence engine, such as ML engine 315. The ML engine 315 enables the service to operate even when faced with a randomization factor.

As used herein, reference to any type of machine learning or artificial intelligence may include any type of machine learning algorithm or device, convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

In some implementations, service 305 is a cloud service operating in a cloud 320 environment. In some implementations, service 305 is a local service operating on a local device, such as the ER system 310. In some implementations, service 305 is a hybrid service that includes a cloud component operating in the cloud 320 and a local component operating on a local device. These two components can communicate with one another.

Service 305 is generally tasked with accessing a color image 325 and a depth image 330 to produce an LSR corrected color image 335 according to the principles outlined herein. In particular, service 305 is tasked with producing a correction map (e.g., a set of per pixel UV corrections) in a fast and efficient manner.

To do so, service 305 interacts or controls a GPU 305A, and this GPU 305A is caused to operate in the "shadow map mode" 305B (aka "shadow map fast path mode"). This shadow map mode is a special rendering mode that allows the GPU to render 3D geometry at a rate at least twice as fast as when the GPU is in a non-shadow-map rendering mode. By employing this fast path, service 305 is able to produce the correction map (e.g., the set of per pixel UV corrections) twice as fast as traditional techniques. Notably, the correction map is stored in memory; so, using only a single Z value as an intermediate to represent the correction offset (e.g., the set of per pixel UV corrections) significantly reduces the memory bandwidth requirements.

The shadow map fast path is restricted, however. For example, the shadow map fast path allows outputting only a single depth value per pixel with no post-processing per pixel allowed. This fast path is generally used for lighting calculations in 3D engines to produce depth maps used for computing shadow information, hence the "shadow" term in its name.

Initially, a pose correction matrix is used a first time (e.g., during a forward projection operation) to generate the Z buffer as a part of a rasterization process, which is performed by the GPU while the GPU is in the shadow map mode 305B. During that rasterization process, a UV map is also created, but this UV map is not used and is actually discarded. Notably, the UV map does include per pixel UV correction values.

In contrast to directly using the per pixel UV correction values in the UV map, service 305 uses the Z buffer to recover or re-derive the per pixel UV corrections (which were discarded when the UV map was discarded). Service 205 relies on these per pixel UV corrections to resample the color image 325. As indicated above, however, the initial lack of per pixel post-processing (which occurs because the GPU is operating in the shadow map mode) dictates that service 305 must recover the per pixel UV corrections from the Z values in the Z buffer. This is achieved by using the pose correction matrix a second time as a part of a backward projection. This backward projection is performed by multiplying the inverse of the pose correction matrix against the Z values in the Z buffer, combined with a division for perspective correction. This produces the set of per pixel UV correction values that service 305 may then use to resample the color image 325.

Regarding the resampling operation, initially, the depth image 330 relates to the uncorrected camera position, but it is desirable to operate using a corrected camera position (corrected to accommodate the user's head movement). The embodiments render an LSR carrier geometry to achieve a new camera position. In the process of rendering the LSR carrier geometry, the embodiments obtain a per target pixel UV correction amount. The embodiments then apply that UV correction to the HMD's current position. Doing so informs service 305 from which position in the original color image 325 the embodiments are to sample the color. Then, the embodiments interpolate the color at that position and generate the corrected color image 335.

The additional backward projection mentioned above does not consume a significant amount of power. Also, this backward projection is often supported by some types of resampling hardware, which may include the capability to apply a perspective matrix correction in the DSP.

Combined, this unique way of using shadow map style fast paths in hardware, together with the additional backward reprojection step, allows performing shadow map based LSR with almost a 2× improvement in speed compared to the traditional UV map based LSR. This technique also allows for the enablement of advanced LSR techniques, such as adLSR, on ER systems, which otherwise would not have the required amount of computational capacity. Further details on the operations performed by service 305 are recited in FIG. 4.

Figure 4:
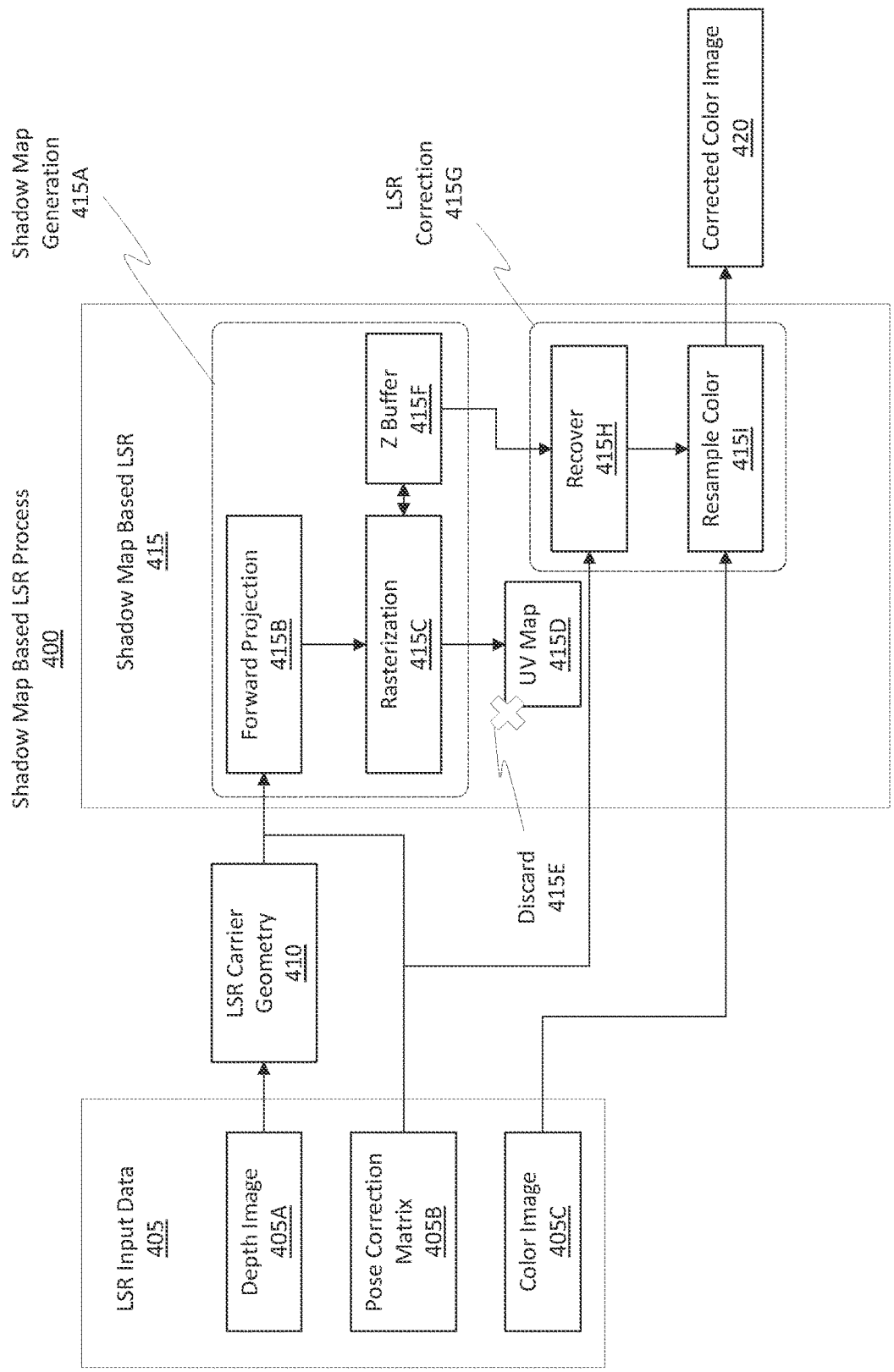
FIG. 4 illustrates an example of a shadow map based LSR process.

FIG. 4 shows a shadow map based LSR process 400, which may be implemented by service 305 of FIG. 3. Similar to the UV map based LSR process 200 of FIG. 2, in FIG. 4, the LSR input data 405 includes a depth image 405A, a pose correction matrix 405B, and a color image 405C. The depth image 405A and the color image 405C are rendered by an application. The pose correction matrix 405B is applied during the LSR process to produce a corrected color image suitable for presentation on the HMD display.

The LSR process extracts a carrier geometry (e.g., as shown by LSR carrier geometry 410) from the application's depth image 405A. LSR carrier geometry 410 is then used during the shadow map based LSR 415, which includes a first phase and a second phase. The first phase is a shadow map generation 415A phase.

In particular, the LSR carrier geometry 410 is forward projected (e.g., as shown by forward projection 415B) by multiplying each vertex of the LSR carrier geometry 410 with the pose correction matrix 405B. That forward projection 415B operation is followed by rasterization 415C operation to produce a set of per pixel UV corrections that is included in a UV map 415D. Notably, in accordance with the disclosed embodiments, service 305 discards this UV map 415D, as shown by discard 415E.

The rasterization 415C operation is performed by the GPU, and the GPU is caused to operate in its "shadow map mode" during the rasterization 415C. Because the GPU is operating in the shadow map mode, the GPU also generates a Z buffer 415F that resolves the Z ordering.

As indicated earlier, the shadow map based LSR 415 includes two phases, namely, the shadow map generation 415A phase and an LSR correction 415G phase. Optionally, these two phases may run on different hardware units.

The LSR correction 415G phase includes a recover 415H step in which service 305 uses the information included in the Z buffer 415F to recover the information that was previously included in the UV map 415D, which was discarded. This recover 415H step involves a backward projection to recover the set of per pixel UV correction values. The backward projection relies on the pose correction matrix 405B. With the traditional UV map based LSR process, the restoration step would output a set of per pixel UV corrections that was directly consumed by the re-sampler. Now, however, the set of per pixel UV corrections embodied in the UV map are discarded but then later recovered (via a derivation process) using the Z buffer 415F and the pose correction matrix 405B.

The recovered set of per pixel UV corrections is then used to resample the color image 405C, as shown by resample color 4151. The final output is a corrected color image 420.

As indicated above, the disclosed embodiments discard the UV map 415D but then perform additional operations using the Z buffer 415F in order to recover the per pixel UV corrections that were included in the UV map 415D. Despite performing these additional operations and despite discarding information that will later be recovered, the disclosed embodiments are able to significantly speed up the LSR process as compared to the time the traditional UV map based LSR process consumed. Also, the disclosed embodiments are able to significantly reduce the amount of memory bandwidth that is consumed.

By way of further detail, with this new approach, instead of relying on the per pixel UV corrections stored in the UV map, which consumes significant memory bandwidth because of its size, the embodiments now store data in the Z buffer, which is used to resolve any occlusions that may exist between pixels, and that data is used to recover or derive the per pixel UV corrections. Notably, the Z buffer is half the size of the UV map. For instance, in some implementations, the UV map is 32 bits per pixel while the Z buffer is only 16 bits per pixel. As a result, the Z buffer uses significantly less memory bandwidth.

Regarding the timing benefits, the GPUs that are used to produce correction maps have special fast paths and hardware where, if nothing is emitted per pixel except for the Z buffer, the operations can be performed in half the amount of time (i.e. a 2× improvement in speed). As a result, the embodiments use half the memory bandwidth and can operate twice as fast as the traditional UV map based LSR approach, which does require a per pixel UV correction.

Thus, the Z buffer 415F can now be used by the color resampling unit to perform the per pixel correction. The Z buffer 415F can now be used because of the additional recover 415H step illustrated in FIG. 4. Notably, the information included in the Z buffer 415F is encoded differently than the information encoded in the UV map 415D. Despite this difference in encoding, the recover 415H operation enables the service 305 to properly recover the per pixel UV corrections. Also, the Z buffer 415F can be stored in the main memory because of its smaller size.

The resampling unit (not illustrated in FIG. 4, but the box labeled LSR correction 415G represents the operations performed by the resampling unit) reads from the Z buffer 415F and then performs an additional matrix multiplication on the Z values in order to recover the per pixel UV corrections that were previously discarded as a result of the UV map 415D being discarded. Notably, the fast path capabilities of the GPU allow the embodiments to achieve significant speed gains despite having to perform additional recovery calculation(s).

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
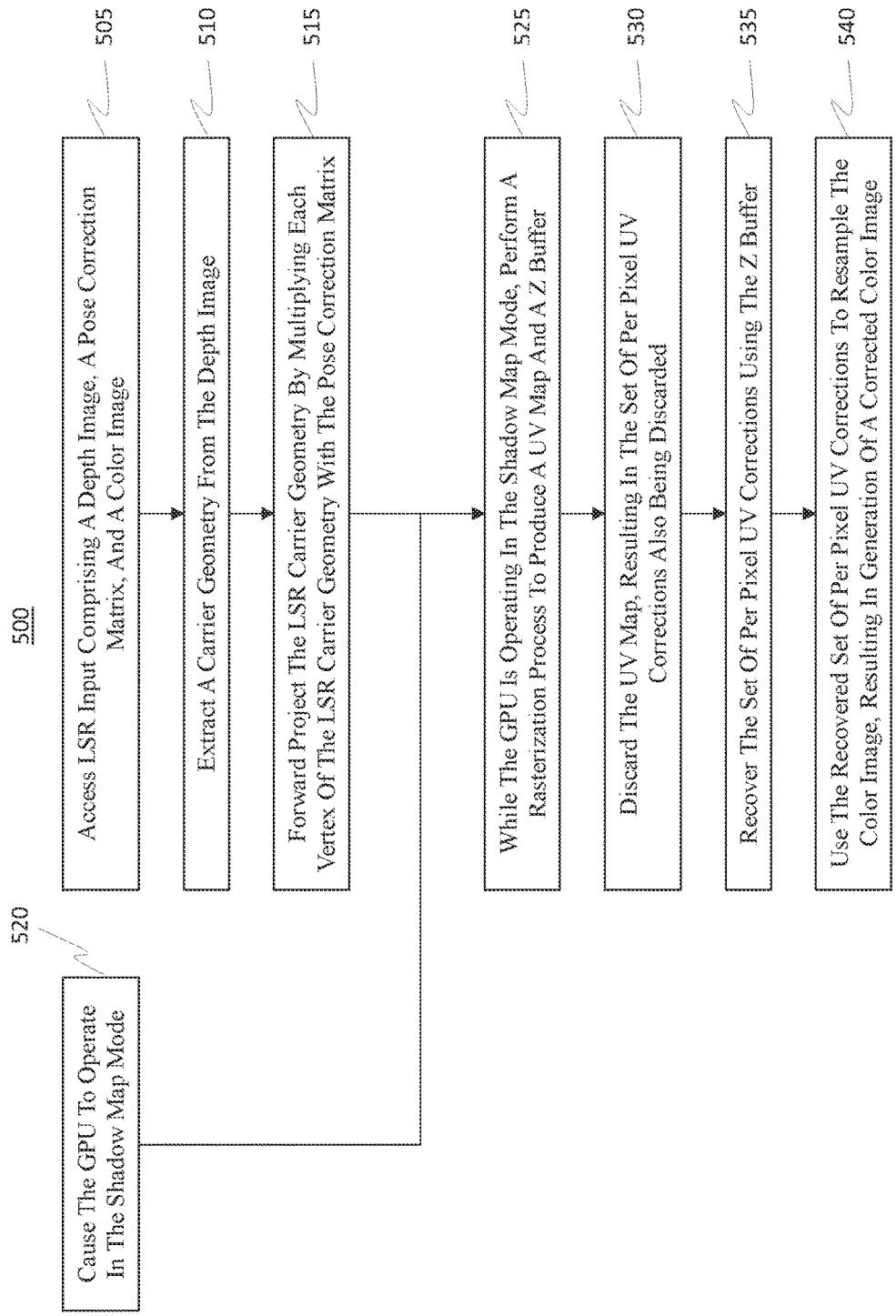
FIG. 5 illustrates a flowchart of an example method for performing a shadow map based LSR process.

Attention will now be directed to FIG. 5, which illustrates a flowchart of an example method 500 for causing a graphics processing unit (GPU) to operate in a shadow map mode to facilitate performance of a shadow map based late stage reprojection (LSR) process to generate a corrected image. Notably, the GPU operating in the shadow map mode enables the GPU to operate faster than when the GPU is not in the shadow map mode. For instance, the GPU operating in the shadow map mode enables the GPU to operate at least twice as fast as when the GPU is not in the shadow map mode.

Method 500 can be implemented by service 305 within architecture 300 of FIG. 3. Optionally, method 500 can be performed using an HMD, such as the ER system 310.

Method 500 includes an act (act 505) of accessing LSR input. This input includes a depth image (e.g., depth image 405A from FIG. 4), a pose correction matrix (e.g., pose correction matrix 405B), and a color image (e.g., color image 405C).

Act 510 includes extracting a carrier geometry from the depth image. The LSR carrier geometry 410 of FIG. 4 is representative.

Act 515 includes forward projecting (e.g., forward projection 415B) the LSR carrier geometry by multiplying each vertex of the LSR carrier geometry with the pose correction matrix. This forward projection is a first projection that is performed as a part of method 500.

Act 520 includes causing the GPU to operate in the shadow map mode. For instance, it may be the case that the GPU was operating in a non-shadow map mode, and the GPU is then caused to transition to the shadow map mode. It may be the case that the transition was triggered at any point prior to rasterization. For instance, the trigger may have occurred when the LSR input was received or when the LSR carrier geometry was extracted or perhaps after the LSR carrier geometry was extracted. Act 520 is shown in an asynchronous manner relative to acts 505, 510, and 515 to demonstrate how act 520 is performed at any time prior to act 525.

While the GPU is operating in the shadow map mode, act 525 includes using the GPU to perform a rasterization process (e.g., rasterization 415C). The rasterization process produces a set of per pixel UV corrections, which are included in a UV map (e.g., UV map 415D). Additionally, as a part of the rasterization process and while the GPU is in the shadow map mode, the GPU generates a Z buffer (e.g., Z buffer 415F), which includes various depth values. Notably, the size of the Z buffer is half the size of the UV map.

Act 530 includes discarding the UV map. Consequently, the set of per pixel UV corrections is also discarded.

Act 535 includes recovering (e.g., recover 415H) the set of per pixel UV corrections using the Z buffer. This recovery includes backward projecting the depth values included in the Z buffer using the pose correction matrix. This backward projection is a second projection that is performed as a part of method 500.

Act 540 includes using the recovered set of per pixel UV corrections to resample (e.g., resample color 4151) the color image, resulting in generation of a corrected color image (e.g., corrected color image 420). Recovering the set of per pixel UV corrections using the Z buffer and then using the recovered set of per pixel UV corrections to resample the color image consumes half as much memory bandwidth as compared to directly using the UV map to resample the color image. Similarly, recovering the set of per pixel UV corrections using the Z buffer and then using the recovered set of per pixel UV corrections to resample the color image is twice as fast as compared to directly using the UV map to resample the color image.

Example Computer/Computer Systems

Figure 6:
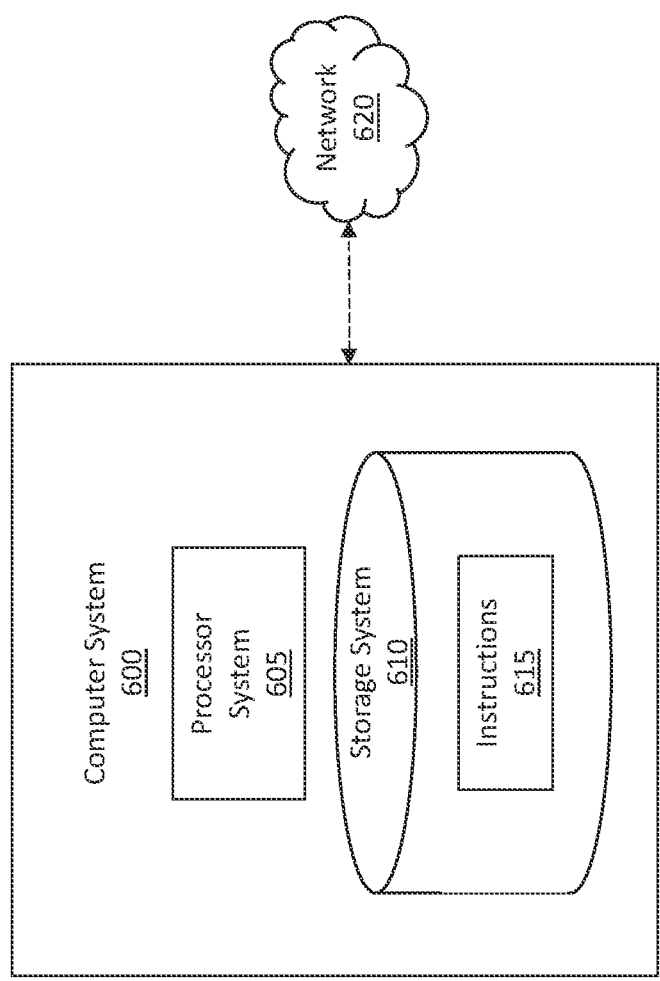
FIG. 6 illustrates an example computer system that can be configured to perform any of the disclosed operations.

Attention will now be directed to FIG. 6 which illustrates an example computer system 600 that may include and/or be used to perform any of the operations described herein.

Computer system 600 may take various different forms. For example, computer system 600 may be embodied as a tablet, a desktop, a laptop, a mobile device, or a standalone device, such as those described throughout this disclosure. Computer system 600 may also be a distributed system that includes one or more connected computing components/devices that are in communication with computer system 600. Computer system 600 can be implemented as the ER system 310 of FIG. 3. Also, computer system 600 can implement service 305.

In its most basic configuration, computer system 600 includes various different components. FIG. 6 shows that computer system 600 includes a processor system 605 that includes one or more processor(s) (aka a "hardware processing unit") and a storage system 610.

Regarding the processor(s) of the processor system 605, it will be appreciated that the functionality described herein can be performed, at least in part, by one or more hardware logic components (e.g., the processor(s)). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," "service," or "engine" can refer to hardware processing units or to software objects, routines, or methods that may be executed on computer system 600. The different components, modules, engines, and services described herein may be implemented as objects or processors that execute on computer system 600 (e.g. as separate threads).

Storage system 610 may be physical system memory, which may be volatile, non-volatile, or some combination of the two. The term "memory" may also be used herein to refer to non-volatile mass storage such as physical storage media. If computer system 600 is distributed, the processing, memory, and/or storage capability may be distributed as well.

Storage system 610 is shown as including executable instructions 615. The executable instructions 615 represent instructions that are executable by the processor(s) of computer system 600 to perform the disclosed operations, such as those described in the various methods.

The disclosed embodiments may comprise or utilize a special-purpose or general-purpose computer including computer hardware, such as, for example, one or more processors and system memory, as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Furthermore, computer-readable storage media, which includes physical computer storage media and hardware storage devices, exclude signals, carrier waves, and propagating signals. On the other hand, computer-readable media that carry computer-executable instructions are "transmission media" and include signals, carrier waves, and propagating signals. Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 600 may also be connected (via a wired or wireless connection) to external sensors (e.g., one or more remote cameras) or devices via a network 620. For example, computer system 600 can communicate with any number devices or cloud services to obtain or process data. In some cases, network 620 may itself be a cloud network. Furthermore, computer system 600 may also be connected through one or more wired or wireless networks to remote/separate computer systems(s) that are configured to perform any of the processing described with regard to computer system 600.

A "network," like network 620, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 600 will include one or more communication channels that are used to communicate with the network 620. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for causing a graphics processing unit (GPU) to operate in a shadow map mode to facilitate performance of a shadow map based late stage reprojection (LSR) process to generate a corrected image, wherein the GPU operating in the shadow map mode enables the GPU to operate faster than when the GPU is not in the shadow map mode, said method comprising:
   accessing LSR input comprising a depth image, a pose correction matrix, and a color image;
   extracting a carrier geometry from the depth image;
   forward projecting the LSR carrier geometry by multiplying each vertex of the LSR carrier geometry with the pose correction matrix;
   while the GPU is operating in a shadow map mode, causing the GPU to perform a rasterization process to produce a set of per pixel UV corrections, which are included in a UV map, wherein the GPU additionally generates a Z buffer comprising depth values;
   discarding the UV map, resulting in the set of per pixel UV corrections also being discarded;
   recovering the set of per pixel UV corrections using the Z buffer, wherein said recovering includes backward projecting the depth values included in the Z buffer using the pose correction matrix; and
   using the recovered set of per pixel UV corrections to resample the color image, resulting in generation of a corrected color image.

2. The method of claim 1, wherein the depth image and the color image are rendered by an application.

3. The method of claim 1, wherein a size of the Z buffer is half a size of the UV map.

4. The method of claim 1, wherein the GPU operating in the shadow map mode enables the GPU to operate at least twice as fast as when the GPU is not in the shadow map mode.

5. The method of claim 1, wherein the Z buffer has 16 bits per pixel.

6. The method of claim 5, wherein the UV map has 32 bits per pixel.

7. The method of claim 1, wherein recovering the set of per pixel UV corrections using the Z buffer and then using the recovered set of per pixel UV corrections to resample the color image consumes half as much memory bandwidth as compared to directly using the UV map to resample the color image.

8. The method of claim 1, wherein recovering the set of per pixel UV corrections using the Z buffer and then using the recovered set of per pixel UV corrections to resample the color image is twice as fast as compared to directly using the UV map to resample the color image.

9. A computer system that causes a graphics processing unit (GPU) to operate in a shadow map mode to facilitate performance of a shadow map based late stage reprojection (LSR) process to generate a corrected image, wherein the GPU operating in the shadow map mode enables the GPU to operate faster than when the GPU is not in the shadow map mode, said computer system comprising:
   a processor system; and
   a storage system that stores instructions that are executable by the processor system to cause the computer system to:
      access LSR input comprising a depth image, a pose correction matrix, and a color image;
      extract a carrier geometry from the depth image;
      forward project the LSR carrier geometry by multiplying each vertex of the LSR carrier geometry with the pose correction matrix;
      while the GPU is operating in the shadow map mode, cause the GPU to perform a rasterization process to produce a set of per pixel UV corrections, which are included in a UV map, wherein the GPU additionally generates a Z buffer comprising depth values;
      discard the UV map, resulting in the set of per pixel UV corrections also being discarded;
      recover the set of per pixel UV corrections using the Z buffer, wherein said recovering includes backward projecting the depth values included in the Z buffer using the pose correction matrix; and
      use the recovered set of per pixel UV corrections to resample the color image, resulting in generation of a corrected color image.

10. The computer system of claim 9, wherein the depth image and the color image are rendered by an application.

11. The computer system of claim 9, wherein a size of the Z buffer is half a size of the UV map.

12. The computer system of claim 9, wherein the GPU operating in the shadow map mode enables the GPU to operate at least twice as fast as when the GPU is not in the shadow map mode.

13. The computer system of claim 9, wherein the Z buffer has 16 bits per pixel.

14. The computer system of claim 13, wherein the UV map has 32 bits per pixel.

15. The computer system of claim 9, wherein recovering the set of per pixel UV corrections using the Z buffer and then using the recovered set of per pixel UV corrections to resample the color image consumes half as much memory bandwidth as compared to directly using the UV map to resample the color image.

16. The computer system of claim 9, wherein recovering the set of per pixel UV corrections using the Z buffer and then using the recovered set of per pixel UV corrections to resample the color image is twice as fast as compared to directly using the UV map to resample the color image.

17. A head mounted device (HMD) that causes a graphics processing unit (GPU) to operate in a shadow map mode to facilitate performance of a shadow map based late stage reprojection (LSR) process to generate a corrected image, wherein the GPU operating in the shadow map mode enables the GPU to operate faster than when the GPU is not in the shadow map mode, said HMD comprising:
   a processor system; and
   a storage system that stores instructions that are executable by the processor system to cause the HMD to:
      access LSR input comprising a depth image, a pose correction matrix, and a color image;
      extract a carrier geometry from the depth image;
      forward project the LSR carrier geometry by multiplying each vertex of the LSR carrier geometry with the pose correction matrix;
      cause the GPU to operate in the shadow map mode;
      while the GPU is operating in the shadow map mode, cause the GPU to perform a rasterization process to produce a set of per pixel UV corrections, which are included in a UV map, wherein the GPU additionally generates a Z buffer;
      discard the UV map, resulting in the set of per pixel UV corrections also being discarded;
      recover the set of per pixel UV corrections using the Z buffer, wherein said recovering includes backward projecting depth values included in the Z buffer using the pose correction matrix; and
      use the recovered set of per pixel UV corrections to resample the color image, resulting in generation of a corrected color image.

18. The HMD of claim 17, wherein the depth image and the color image are rendered by an application.

19. The HMD of claim 17, wherein a size of the Z buffer is half a size of the UV map.

20. The HMD of claim 17, wherein the GPU operating in the shadow map mode enables the GPU to operate at least twice as fast as when the GPU is not in the shadow map mode.

* * * * *